United States Patent [19]

Boyarsky et al.

[11] Patent Number: 5,441,658
[45] Date of Patent: Aug. 15, 1995

[54] CRYOGENIC MIXED GAS REFRIGERANT FOR OPERATION WITHIN TEMPERATURE RANGES OF 80°K- 100°K

[75] Inventors: Mikhail Boyarsky; Boris Yudin; Victor I. Mogorychny, all of Moscow, Russian Federation; Larry Klusmier, Allentown, Pa.

[73] Assignee: APD Cryogenics, Inc., Allentown, Pa.

[21] Appl. No.: 149,203

[22] Filed: Nov. 9, 1993

[51] Int. Cl.$^6$ ............................................. C09K 5/04
[52] U.S. Cl. ................................. 252/67; 62/114
[58] Field of Search ........................... 252/67; 62/114

[56] References Cited

U.S. PATENT DOCUMENTS 1,325,667 12/1919 Crawford ........................ 252/67

FOREIGN PATENT DOCUMENTS 0271989  6/1988  European Pat. Off. .
379603   4/1973  Russian Federation .
565052   7/1977  Russian Federation .
627154  10/1978  Russian Federation .
637417  12/1978  Russian Federation .
907054   2/1982  Russian Federation .
918298   4/1982  Russian Federation .
1054400 11/1983  Russian Federation .
1089099  4/1984  Russian Federation .
1336892 11/1973  United Kingdom .
1336892 11/1973  United Kingdom .

Primary Examiner—Christine Skane
Attorney, Agent, or Firm—Helfgott & Karas

[57] ABSTRACT

A mixed gas refrigerant for use in the cryogenic range of temperatures between 80° K. and 100° K., with single stage compressor providing high pressures up to 30 Arms. The refrigerant consists of nitrogen between 30 and 50 molar percent, methane less than 20 molar percent, propane, more than 30 molar percent, and ethane the balance.

2 Claims, 2 Drawing Sheets

CRYOGENIC MIXED GAS REFRIGERANT FOR OPERATION WITHIN TEMPERATURE RANGES OF 80°K- 100°K

This invention relates to mixed gas refrigerants and, more particularly, to a mixed gas refrigerant for cryogenic use, preferably within the cryogenic range at temperatures from 80° K. to 100° K. and which provides improved efficiency and improved temperature stability with respect to prior art cryogenic refrigerants.

BACKGROUND OF THE INVENTION

In closed cycle refrigerating systems operating within usual household or commercial refrigeration temperature ranges, refrigerants utilized are typically Freon-type pure gases or, more recently, mixed gases, frequently utilizing Freon at least as one of the constituents. Such refrigeration systems operating in the household refrigeration range utilize equipment which can well reach within the desired pressure ratios, temperature ranges, and efficiencies required.

When operating cooling systems into the cryogenic range, refrigerants usually have boiling temperatures below 120° K. such as nitrogen, argon helium, methane, and the like. These cryogenic gases have typically required the use of very high pressure gas systems involving multi-stage compressors or high pressure oil-less compressors. These systems therefore become more expensive to manufacture and operate, and require frequent maintenance.

In order to provide cryogenic systems which are less costly and more efficient, there have been proposed numerous mixed gas refrigerants for use within the cryogenic temperature range. In fact, many such mixed gas arrangements have been provided. These typically combine the standard well-known cryogenic refrigerants such as nitrogen, argon, neon, and the like, with various hydrocarbons, including methane, ethane, propane, and isobutane, in various combinations. Each of these have provided a specific arrangement of components with specified percentages of the various ingredients.

One reference that has heretofore described a mixed gas cryogenic refrigerant is Russian Pat. No. 627,154. This patent suggests a mixed gas refrigerant combining nitrogen with various ones of the hydrocarbons. One of the mixed gas refrigerants suggested includes the composition of nitrogen: 25–40% by molar weight, methane: 20–35% by molar weight, ethane: 15–35% by molar weight; and propane: 25–45% by molar weight.

Another reference which has suggested a combination of the same above ingredients, but in different proportions, is UK Pat. No. 1,336,892. There again, numerous types of combinations of the standard cryogenic refrigerants, such as nitrogen, are combined with various ones of the hydrocarbons have been suggested. In one of those combinations, they also teach the combination of nitrogen: 20–70% by molar weight (specifically recited as volume); methane: 10–30% by molar weight; ethane: 10–25% by molar weight; and propane: 10–25% by molar weight.

While each of these two references teach specific percent compositions of the same four ingredients, it has been found that the efficiencies and refrigeration per unit volume of gas entering the compressor, varies for each of these combinations. Furthermore, it has been found that through an understanding of specific temperatures and pressures required in a cryogenic system, it is possible to make a more specific selection of molar fraction percent of the ingredients in order to achieve an even greater and unexpectedly improved efficiency and value of refrigeration per unit volume of gas entering the compressor. Such unexpected results have been found by redefining the percent concentration of the various ingredients, wherein the unexpected improvement has resulted.

SUMMARY OF THE INVENTION

Accordingly, it is an object of the present invention to provide a mixed gas refrigerant for cryogenic temperature ranges which provides improved efficiencies and improved refrigeration temperature stability, as compared to prior art mixed gas refrigerants.

Another object of the present invention is to provide a mixed gas refrigerant for cryogenic use within the temperature ranges of 80° K. to 100° K. and which can be utilized with a one-stage compressor providing high pressures of up to 25–30 atmospheres.

Specifically, in accordance with the present invention, there is provided a mixed gas cryogenic refrigerant for use with high pressures up to 30 atmospheres, at temperatures from 80° K. to 100° K. consisting of 30–50% molar percent of nitrogen, less than 30 molar percent of methane, more than 30 molar percent of propane, and the balance, ethane.

BRIEF DESCRIPTION OF THE DRAWINGS

The novel features believed characteristic of the invention are set forth in the appended claims. The invention itself, together with any further objects and advantages, will be best understood by reference to the following detailed description, taken in conjunction with the accompanying drawings, in which:

DETAILED DESCRIPTION OF THE INVENTION

Figure 1:
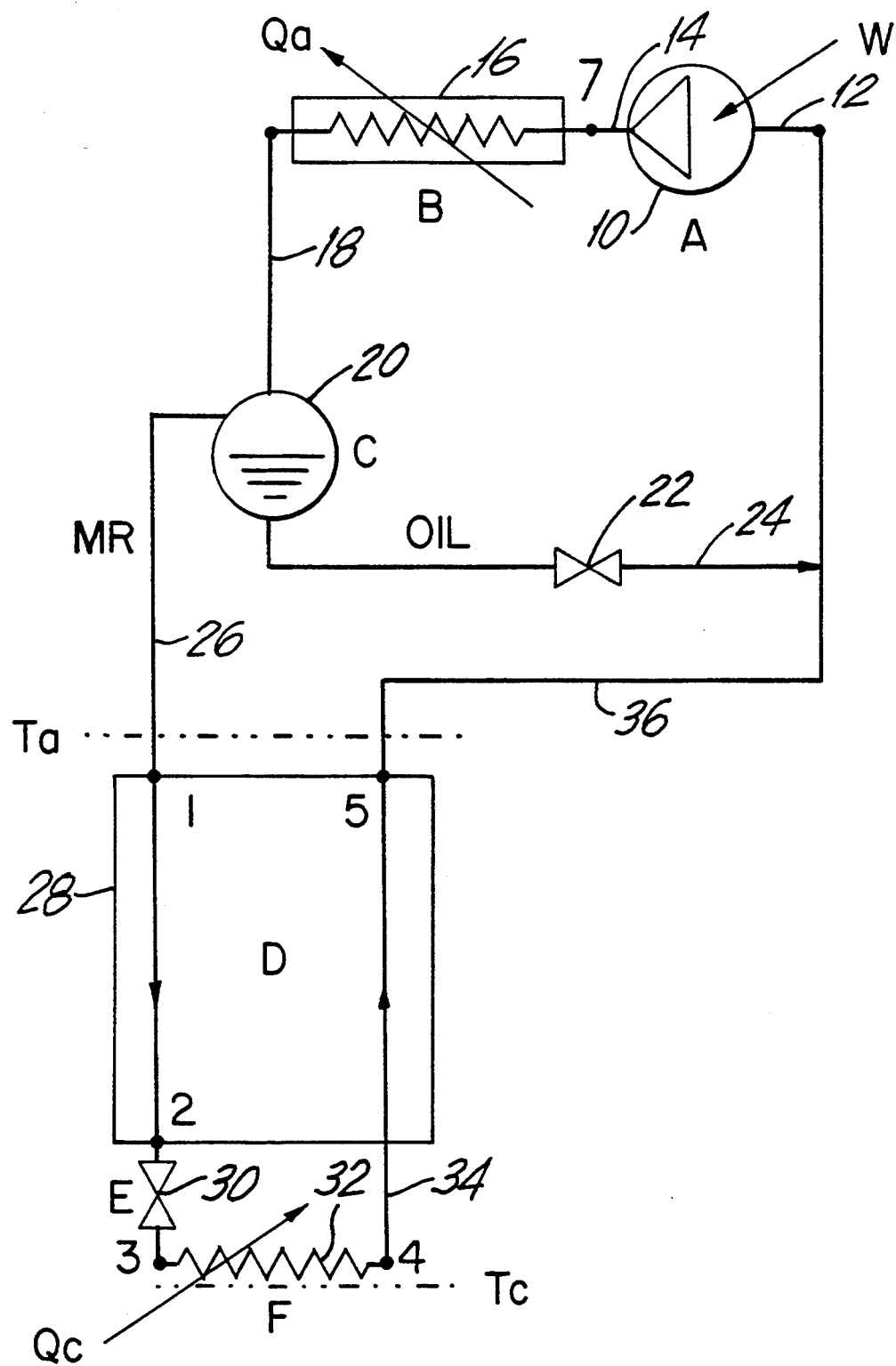
FIG. 1 is a schematic drawing of a single stage cryogenic refrigeration system.

The mixed gas refrigerant for the cryogenic range of the present invention will be utilized in a typical Joule-Thompson (JT) cycle operating in the cryogenic range. If the refrigerator is based on an oil-lubricated compressor, it will be necessary to utilize an oil separator to purify the high-pressure flow of the mixed gas refrigerant before it flows to the cold block. The principle scheme of such a refrigerator is shown in FIG. 1, wherein a compressor 10 cyclically receives a refrigerant of the mixed gas and entrained oil from a low pressure inlet 12 and discharges compressed gas and entrained oil onto a high pressure line 14. The compressed gas is passed to an after-cooler 16. After-cooler 16 may be air or water cooled and functions to remove the heat of compression and, perhaps to condense a high temperature component in the gas mixture. The output from the after-cooler along line 18 passes to the oil separator 20 which may be a simple gas-liquid filter. It receives the compressed gas mixture and entrained oil, and functions to separate the oil from the gas. The oil is delivered back to the compressor 10 through the valve 22 on line 24. The mixed gas along high pressure line 26 is sent to the regenerative heat exchanger 28. Typically, the heat exchanger can be a JT cryostat encased in vacuum isolation. There is no need for any intermediate phase separators. The cryostat comprises a counter-flow heat exchanger in which all of the input fluid stream flows the through input high pressure coil to the cold end where it drops in pressure as it flows through a JT throttle valve 30. The fluid stream then flows through the evaporator 32 where it absorbs heat from a load being cooled and returns to the warm end of the compressor 28 through the low pressure coil of the cryostat along line 34. It then returns to the low pressure line 36 back to the compressor 10.

Figure 2:
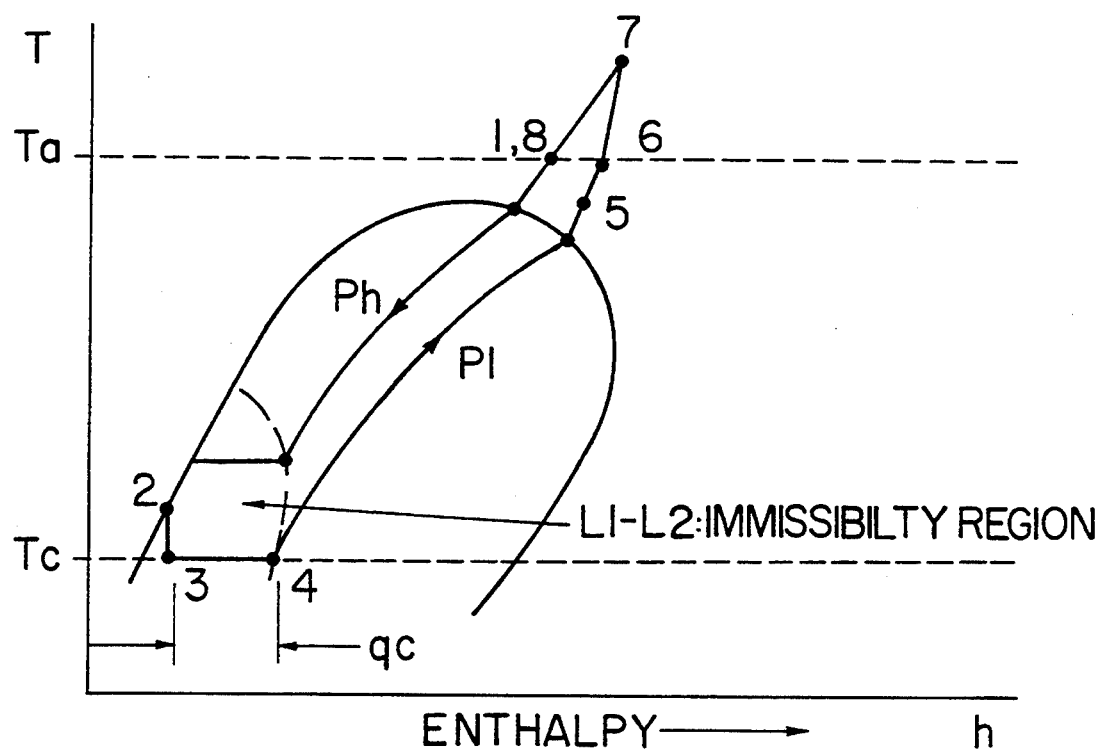
FIG. 2 is a temperature-enthalpy diagram of the thermodynamic cycle of the mixed gas refrigerant.

Many different types of mixed gas refrigerants for this type of JT cycle refrigerator has been proposed and described in the prior art. To provide high values of efficiency, the mixed gas refrigerant should include a low-boiling component like nitrogen or argon, and high-boiling components like hydrocarbons and their halogen derivatives. The composition of the mixed gas refrigerant and the limits of concentration for each component can be chosen with regard to the following parameters:

Ta—Ambient Temperature, K
Tc—Cooling Temperature, K
Ph—High Pressure of the Cycle, MPa
Pl—Low Pressure of the Cycle, MPa
W—Specific Work of the Compressor, W/(g/s)
Qv—Refrigeration per Unit Volume of Gas Entering Compressor, J/m$^3$
$q_c$—Specific Refrigeration Capacity, W/(g/s)
Eff—Efficiency Relative of Carnot
h—Enthalpy—J/g
S—Entropy—J/gk
v—Specific Volume, L/g The specific work of the compressor as hereabove defined, the specific refrigeration, and efficiency, all as above described, are related to the other parameters as follows:

$W = (h_7 - h_6) - T_a (S_7 - S_6)$
$qc = h_4 - h_3$ (the minimum h between $P_h$ and $P_l$)
$Eff = q_c [(T_a/T_c) - 1]/W$
$Qv = (h_4 - h_3)/v_6$ The location of the state of the points are given in FIGS. 1 and 2 attached.

To provide a constant temperature in the evaporator, it is necessary to use a mixed gas refrigerant blend which splits into two liquid phases L1 and L2, as shown in FIG. 2. The liquid phases are immisible at low temperature with the immisibility region being shown in the diagram by the dash line.

In order to use a single stage compressor that is designed for typical air conditioning service and utilize it within the cryogenic range, the operating pressure should be approximately 20/2 Atm. The critical pressure of the mixed gas refrigerant should be greater than the maximum operating pressure for good efficiency. In this case, some of the mixed refrigerant blends which are known contain a large amount of one or more components for critical temperatures greater than Ta, and may therefore form a liquid phase at point 8. In FIG. 1, it is noted that point 8 relates to ambient temperature Ta and high pressure Ph. As a result, such known blends cannot be used in a refrigerator with an oil-lubricated compressor because of various reasons.

Firstly, if liquid is formed in the after-cooler, it will be removed from the flow at the oil separator together with the oil. As a result, it would not circulate through the heat exchanger, throttle, and evaporator. Additionally, if the ambient temperature Ta changes, the composition of the mixed gas refrigerants circulating through the cold block will also change as the high-boiling components are dissolved or released from the oil.

At the same time, the presence of the high-boiling component within the gas mixture can increase the power efficiency of the cycle and the specific cooling capacity can be even higher. As a result, it is necessary to optimize the presence of the high-boiling components and minimize the oil problem by not decreasing the viscosity of the oil within the mixture.

When specifically utilizing a single stage compressor operating at pressures approximately 22/2 Atm, it has been possible to optimize the compositions and percentages of the mixed gas refrigerant in order to achieve higher efficiencies than that of the prior art. By way of example, Russian Pat. No. 627,154 has suggested a composition of a mixed gas cryogenic refrigerant as follows:

| | |
|---|---|
| nitrogen | 25–40% by molar fraction |
| methane | 20–25% by molar fraction |
| ethane | 15–35% by molar fraction |
| propane | 25–45% by molar fraction |

Likewise, UK Pat. No. 1,336,892 has suggested different proportions for the same components as follows:

| | |
|---|---|
| nitrogen | 20–70% by molar fraction |
| methane | 10–30% by molar fraction |
| ethane | 10–25% by molar fraction |
| propane | 10–25% by molar fraction |

The present invention has found that using the above does not provide the best efficiency values, as well as the best values of QV. On the contrary, the following has been found to be a more efficient composition:

| | |
|---|---|
| nitrogen | 30–50% molar fraction |
| methane | less than 20% by molar fraction |
| propane | greater than 30% by molar fraction |
| ethane | balance |

The improvement in efficiencies and QV of the specific unique combination of the present invention has been noted. The efficiency values permit an estimation of the power efficiency of a mixed gas refrigerant, while the QV characterizes the cooling capacity of the refrigerator based on the same size compressor.

By way of example, the following tables show a comparison of performance of the present invention with comparison to the mixtures of the Russian Pat. No. 627,154. The comparisons are taken at operating pressures that are typical of a single stage, oil-lubricated compressor. Performance at several operating pressures are listed for gas mixtures that are within the scope of the present invention, as well as those covered by this patent:

TABLE 1

| $P_h$ = 22 atm; $P_l$ = 2.6 atm; $T_o$ = 90 K | | | | | |
|---|---|---|---|---|---|
| Components, mole % | | | | | |
| | $N_2$ | $CH_4$ | $C_2H_6$ | $C_3H_8$ | Eff | QV |
| Prior art | 25 | 20 | 25 | 30 | 0.30 | 18.0 |
| Present invention | 30 | 15 | 25 | 30 | 0.42 | 25.6 |
| Prior art | 35 | 10 | 25 | 30 | 0.36 | 22.0 |

TABLE 2

$P_L$ = 1.2 atm; $P_h$ = 22.0 atm; $T_o$ = 83 K

| | Components, mole % | | | | | |
|---|---|---|---|---|---|---|
| | $N_2$ | $CH_4$ | $C_2H_6$ | $C_3H_8$ | Eff | QV |
| Present invention | 30 | 15 | 25 | 30 | 0.37 | 12.5 |
| Prior art | 30 | 20 | 20 | 30 | 0.34 | 11.7 |
| Prior art | 25 | 20 | 25 | 30 | 0.30 | 10.3 |

TABLE 3

$P_L$ = 3.6 atm; $P_h$ = 22 atm; $T_o$ = 92 K

| | Components, mole % | | | | | |
|---|---|---|---|---|---|---|
| | $N_2$ | $CH_4$ | $C_2H_6$ | $C_3H_8$ | Eff | QV |
| Present invention | 30 | 15 | 25 | 30 | 0.45 | 33.9 |
| Present invention | 35 | 10 | 25 | 30 | 0.37 | 27.3 |
| Prior art | 25 | 20 | 25 | 30 | 0.29 | 21.2 |

TABLE 4

$P_L$ = 2.0 atm; $P_h$ = 22 atm; $T_o$ = 86 K

| | Components, mole % | | | | | |
|---|---|---|---|---|---|---|
| | $N_2$ | $CH_4$ | $C_2H_6$ | $C_3H_8$ | Eff | QV |
| Present invention | 30 | 15 | 25 | 30 | 0.41 | 20.3 |
| Prior art | 35 | 10 | 25 | 30 | 0.37 | 18.6 |
| Prior art | 25 | 20 | 25 | 30 | 0.29 | 14.0 |

In addition, five compositions were generated, of which Nos. 1, 2, and 5 were generated in accordance with the present invention, composition No. 3 corresponds to that of UK Pat. No. 1,336,892, and composition No. 4 corresponds to Russian Pat. No. 627,154. These are shown in the following Table 5:

TABLE 5

| ID # | | Components, mole % | | | |
|---|---|---|---|---|---|
| | | $N_2$ | $CH_4$ | $C_2H_6$ | $C_3H_8$ |
| 1 | Present invention | 30 | 15 | 25 | 30 |
| 2 | Present invention | 30 | 15 | 20 | 35 |
| 3 | UK 1336892 | 35 | 15 | 25 | 25 |
| 4 | Russian 627,154 | 30 | 20 | 15 | 35 |
| 5 | Present invention | 30 | 15 | 15 | 40 |

With reference now to Table 6, these five mixed gas refrigerants were compared for their cycle characteristics for high pressure at 22 Atms, $Q_c$=1 Watt, and Ta at 300° K.

TABLE 6

Cycle characteristics for $P_h$ = 22 atm, $Q_c$ = 1 W. Ta = 300 K

| ID # | Tc. K | G. 1/h | $n_c$. % | Tmin. | Pl. atm |
|---|---|---|---|---|---|
| 1 | 80 | 86.71 | 36.64 | 79.0 | 1.1 |
| | 90 | 37.71 | 42.37 | 88.7 | 2.7 |
| 2 | 80 | 82.30 | 38.7 | 79.07 | 1.1 |
| | 90 | 35.78 | 44.76 | 88.7 | 2.7 |
| 3 | 80 | 100.74 | 30.77 | 79.05 | 1.1 |
| | 90 | 43.93 | 35.3 | 88.06 | 2.7 |
| 4 | 80 | 88.30 | 32.00 | 78.11 | 1.1 |
| | 90 | 38.20 | 41.9 | 88.2 | 2.7 |
| 5 | 80 | 78.20 | 40.88 | 79.08 | 1.1 |
| | 90 | 36.54 | 43.80 | 88.07 | 2.7 |

It will be noted that with respect to all of the comparisons that the present specific unique mixture has provided for unexpected and improved efficiencies beyond that of either of the prior art. Such unexpected efficiency improvements by varying the composition components is totally unexpected.

It has been noted that by substituting ethylene instead of ethane, the Carnot power efficiency at cooling temperatures between 85° K. and 100° K. can be achieved, especially for the mixtures which contain a small amount of methane to stabilize the refrigeration temperature within the limits less than dt=0.1.

It should also be noted that for experimentation it has been found that the total contents of both the low boiling components, nitrogen and methane, should be limited to values of between 40–55% by molar fraction.

While I have described a particular embodiment of the invention, many modifications can be made and, I intend by the appended claims to cover all such modifications which generally fall within a broad interpretation of the scope of the language employed.

We claim:

1. A mixed gas cryogenic refrigerant for use in a throttle refrigerator having an oil-lubricated compressor, which provides high pressure up to about 30 Atms at temperatures from 80° K. to 100° K., consisting of:

| | |
|---|---|
| nitrogen | 30–50 molar percent |
| methane | at least some but less than 20 molar percent |
| propane | more than 30 molar percent |
| ethane or ethylene | balance. |

2. A mixed gas of cryogenic refrigerants as in claim 1, wherein the total of the nitrogen and the methane is between 40–55%.

* * * * *